(12) United States Patent
Weismiller et al.

(10) Patent No.: US 8,959,206 B2
(45) Date of Patent: Feb. 17, 2015

(54) DESKTOP CONTROL OF TRAFFIC TRANSMITTED TO A USER DEVICE

(75) Inventors: Kevin J. Weismiller, South Riding, VA (US); Mark D. Carney, Sterling, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 418 days.

(21) Appl. No.: 13/400,999

(22) Filed: Feb. 21, 2012

(65) Prior Publication Data

US 2013/0219047 A1 Aug. 22, 2013

(51) Int. Cl.
  *G06F 15/16* (2006.01)
  *G06F 3/0481* (2013.01)
  *H04L 12/26* (2006.01)

(52) U.S. Cl.
  CPC .............. *G06F 3/0481* (2013.01); *H04L 43/02* (2013.01)
  USPC ............ 709/224; 709/217; 709/231; 709/232

(58) Field of Classification Search
  CPC ....................................................... G06F 9/445
  USPC .......... 715/784, 788, 781, 779, 764; 709/225, 709/203, 224, 232; 347/29, 16
  See application file for complete search history.

(56) References Cited

U.S. PATENT DOCUMENTS

| | | | |
|---|---|---|---|
| 2010/0138528 A1* | 6/2010 | Frank | 709/224 |
| 2012/0066679 A1* | 3/2012 | Pappas et al. | 718/1 |
| 2012/0272234 A1* | 10/2012 | Kaiser et al. | 718/1 |

OTHER PUBLICATIONS

ITU-T T.128, Series T: Terminals for Telematic Services: Data protocols for multimedia conferencing, Jun. 2008.*
International Telecommunication Union, ITU-T Telecommunication Standardization Sector of ITU; Series T: Terminals for Telematic Service—Data Protocols for Multimedia Conferencing—Multipoint Application Sharing, Recommendation ITU-T T.128, Jun. 13, 2008, 204 pages.
"Remote Desktop Protocol" retrieved online: http://en.wikipedia.org/wiki/Remote_Desktop_Protocol; print date: Feb. 21, 2012; 6 pages.

* cited by examiner

*Primary Examiner* — David Lazaro
*Assistant Examiner* — Charles Murphy

(57) ABSTRACT

A system is configured to obtain information that identifies a first rate for first traffic associated with an object within a desktop associated with a user device and a second rate for second traffic associated with another object within the desktop; provide a virtual desktop based on the information; create a first zone, within the desktop, associated with the object; create a second zone, within the desktop, associated with the other object; compare the first rate and the second rate to a threshold; provide, via the virtual desktop, the first zone, having first appearance attributes, based on the first rate being greater than the threshold, and the second zone, having second appearance attributes, based on the second rate not being greater than the threshold; receive selection of the first zone; and output a request to control the first traffic based on the selection of the first zone.

25 Claims, 10 Drawing Sheets

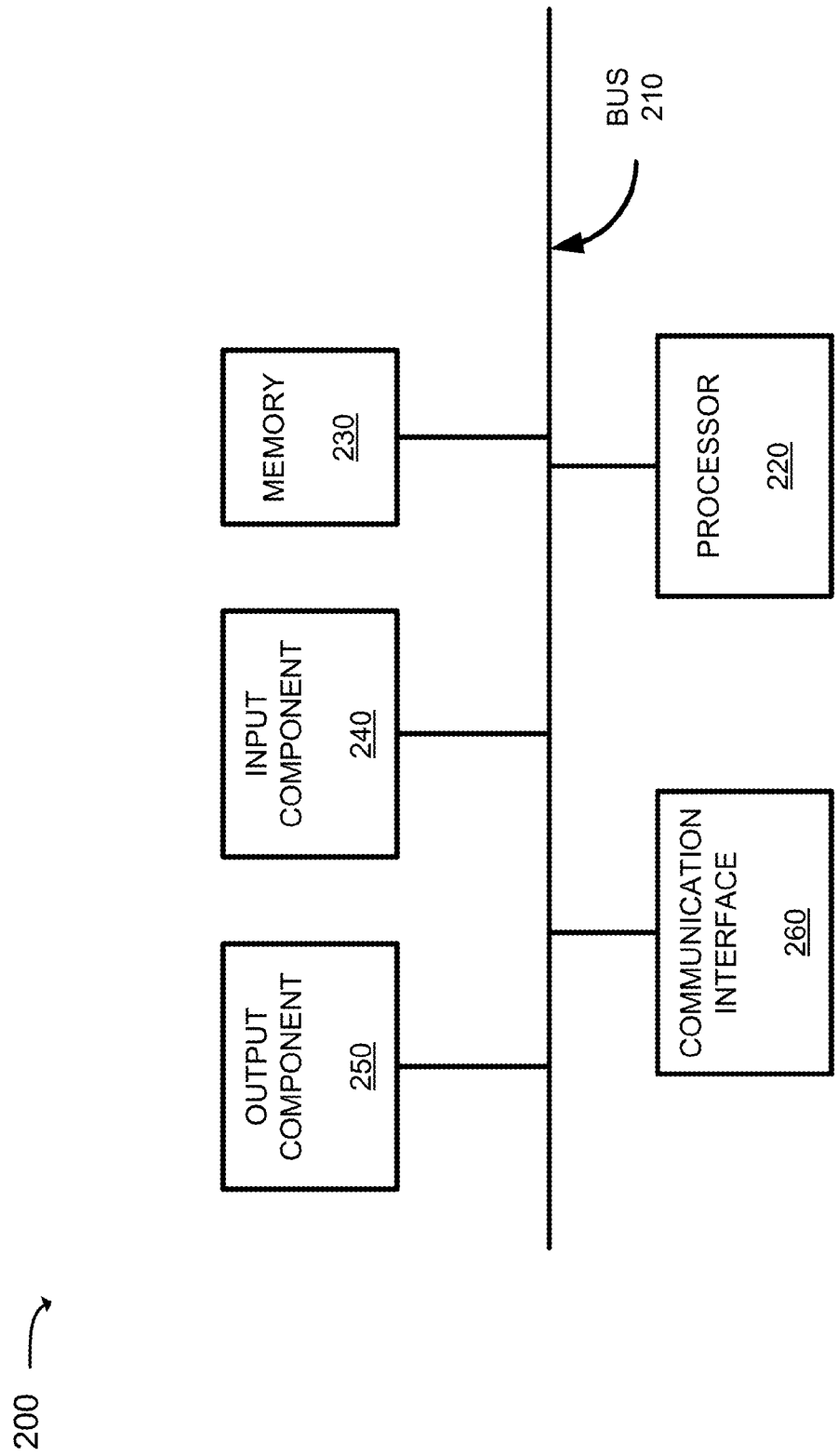

| USER DEVICE INFO 305 | | | | |
|---|---|---|---|---|
| ZONE ID 310 | ZONE INFO 315 | | | |
| | | APPLICATION INFO 320 | CONTENT TYPE 325 | |
| | | | | TRAFFIC RATE 330 | CONTENT STATES 335 |

(table schematic: fields 305, 310, 315, 320, 325, 330, 335 with "..." continuation)

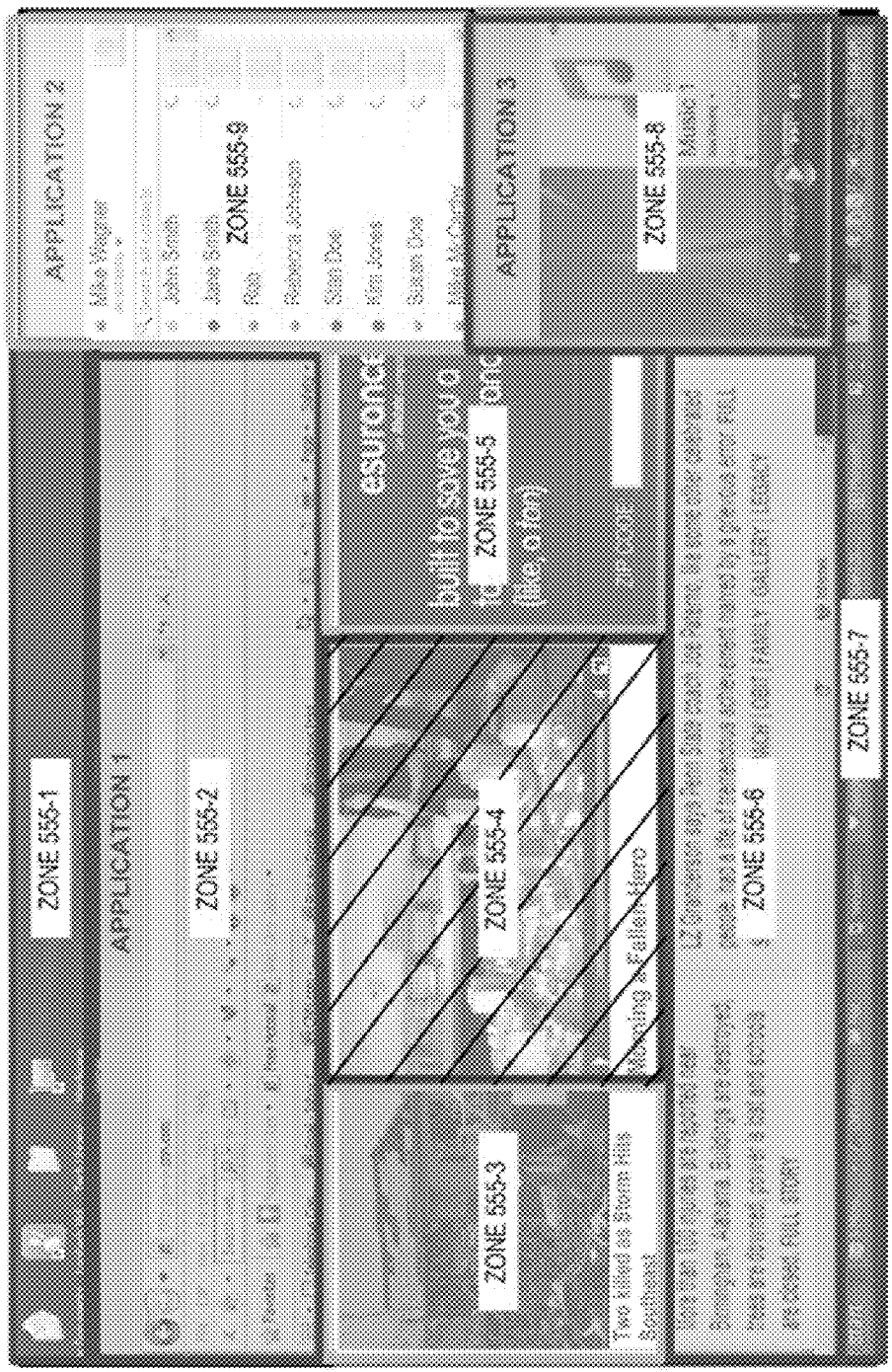

DESKTOP CONTROL OF TRAFFIC TRANSMITTED TO A USER DEVICE

BACKGROUND

User devices perform an increasing variety of tasks that allow users to make and receive calls, send and receive messages (e.g., emails, instant messages, etc.), access and interact with the Internet, play games, make electronic purchases, communicate via social networking, etc. The user devices may perform these tasks using and/or accessing applications that send and/or receive traffic associated with each of the tasks. The users may interact with the applications via desktops associated with the user devices. The desktops may also be accessed by network administrators via devices that are located remotely from the user devices.

Unfortunately, traffic associated with one or more applications, running on a user device, may cause a bandwidth and/or processing capacity, associated with the user device, to be reached. When the bandwidth and/or processing capacity is reached, a user or a network administrator may be unable to access and/or use the desktop to perform an operation on the user device, such as troubleshooting a problem, installing software, etc.

BRIEF DESCRIPTION OF THE DRAWINGS

FIG. 2A is a diagram of example components of one or more devices of FIG. 1;

FIG. 3 is a diagram of an example data structure that may store traffic information corresponding to a desktop associated with a user device;

FIGS. 5A and 5B are diagrams of an example desktop that may be associated with a user device of the environment of FIG. 1;

DETAILED DESCRIPTION OF PREFERRED EMBODIMENTS

The following detailed description refers to the accompanying drawings. The same reference numbers in different drawings may identify the same or similar elements.

A system and/or method, described herein, may enable a remote server to access a desktop, associated with a user device, to obtain traffic information associated with an application open on the desktop (e.g., a browser application, an email application, a game, an application to play a movie, etc.) and/or content displayed on the desktop (e.g., text, an image, an icon, a toolbar, a, video, a desktop background, etc.). The remote server may identify zones, associated with portions of area within the desktop, that correspond to the application and/or the content. A zone, corresponding to an application, may be associated with a traffic flow if the application is communicating with a network based on the traffic flow. Additionally, or alternatively, a zone, corresponding to the content or an application that does not communicate with a network, may not be associated with a flow of traffic.

The remote server may use the traffic information to identify a zone associated with a traffic rate (e.g., a bandwidth utilization rate, a frame rate, an update rate, a data rate, etc.) that is greater than a threshold. The remote server may, based on predetermined settings, cause the traffic rate, at which traffic associated with the identified zone is being transmitted to the user device, to be reduced.

The remote server may also, or alternatively, create a virtual desktop that is based on the desktop associated with the user device. The remote server may provide, for display via the virtual desktop, an overlay that identifies the zones based on the traffic information. The overlay may allow an operator, of the remote server, to interact with the overlay to cause content, displayed within a selected zone, to be updated, to temporarily stop being updated, to change a traffic rate associated with the selected zone, etc.

The system and/or method may enable the user device to use the traffic information to identify a zone associated with a traffic rate that is greater than a threshold. The user device may provide an overlay, for the desktop, that identifies the zones. The user may interact with the overlay to select the identified zone and/or to control the traffic rate associated with the selected zone.

Controlling a traffic rate at which traffic, associated with a zone, is transmitted to the user device may allow an amount of available bandwidth and/or processing capacity, associated with the user device to be managed. Managing the amount of available bandwidth and/or processing capacity may improve the performance of an operation on the user device, over performance of the operation without controlling the rate at which the traffic is transmitted to the user device.

Figure 1:
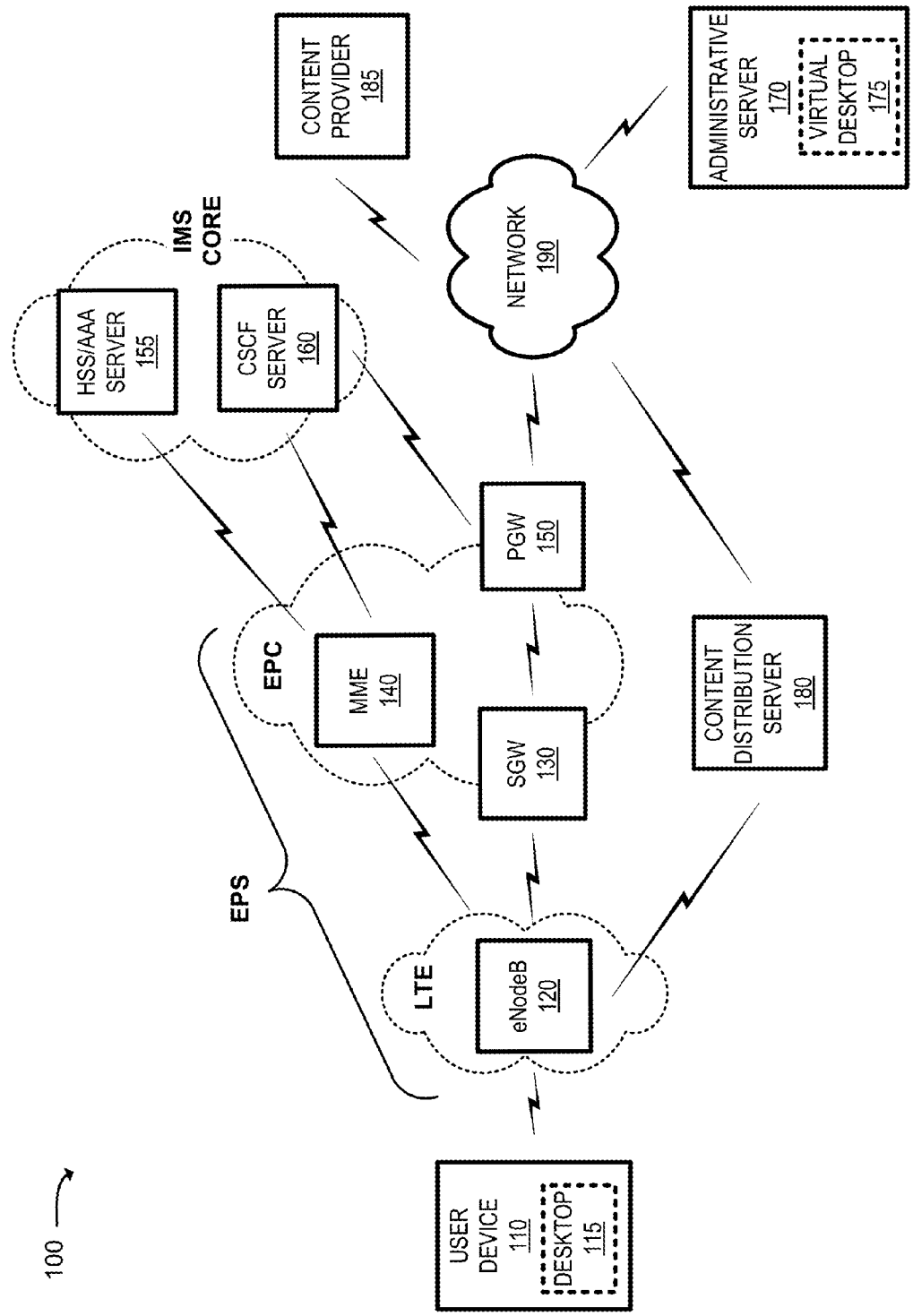
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a user device 110, a desktop 115, a base station 120, a serving gateway 130 (hereinafter referred to as "SGW 130"), a mobility management entity device 140 (hereinafter referred to as "MME 140"), a packet data network (PDN) gateway (PGW) 150, a home subscriber server (HSS)/authentication, authorization, accounting (AAA) server 155 (hereinafter referred to as an "HSS/AAA server 155"), a call session control function (CSCF) server 160 (hereinafter referred to as "CSCF server 160"), an administrative server 170, a virtual desktop 175, a content distribution server (CDS) 180, a content provider 185, and a network 190. The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Environment 100 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more eNodeBs (eNBs) via which user device 110 communicates with the EPC. The EPC may include SGW 130, MME 140, and/or PGW 150 that enables user device 110 to communicate with network 190 and/or an Internet protocol (IP) multimedia subsystem (IMS) core. The IMS core may include HSS/AAA server 155 and/or CSCF server 160 and may manage authentication, session initiation, account information, a user profile, etc. associated with user device 110.

User device 110 may include any computation or communication device, such as a wireless mobile communication device that is capable of communicating with base station 120 and/or a network (e.g., network 190). For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 110 may send traffic to and/or receive traffic from network 190.

User device 110 may execute applications stored in a memory associated with user device 110. User device 110 may also, or alternatively, communicate, via network 190, with content provider 185 to obtain content (e.g., video content, image content, advertising content, etc.) and/or access a service and/or application (e.g., via a website hosted by content provider 185). User device 110 may provide, for display on user device 110, desktop 115 that represents a user interface associated with an operating system running on user device 110. Desktop 115 may allow a user, of user device 110, to interact with the operating system and/or with applications and/or services running on and/or being accessed by user device 110. Desktop 115 may, for example, allow the user to select an application, open a user interface associated with an application, close an application, access content via a user interface, and/or perform other operations associated with an application.

User device 110 may host a client application that allows traffic information, associated with applications that are open, accessible via desktop 115, and/or communicating with network 190, to be obtained. User device 110 may use the client application to identify one or more zones associated with desktop 115 based on the traffic information. The zones may represent portions of area, of desktop 115, that are associated with applications open on the desktop (e.g., associated with user interfaces associated with a browser application, an email application, an application to download and/or play a movie, etc.) and/or content displayed on the desktop (e.g., text, an image, an icon, a toolbar, a video, a desktop background, etc.). The traffic information for a zone may identify a data rate associated with traffic (e.g., bandwidth utilization, frame rates, etc.), a type of traffic (e.g., video traffic, image traffic, message traffic, advertising, etc.), an application associated with the traffic (e.g., an application name, identifier, etc.) and/or an area of the desktop with which no traffic is associated (e.g., a word processor application, an icon, a taskbar, an area of desktop background, etc.).

User device 110 may use the application to provide, for display via desktop 115, an overlay that identifies areas and/or features associated with the zones based on the traffic information. The overlay may, for one of the zones, identify an area of desktop 115 covered by the zone (e.g., based on zone borders, dimensions, screen coordinates, etc.), information that uniquely identifies the zone (e.g., a zone identifier, etc.), an application with which the zone is associated (e.g., an application name, an icon, etc.), and/or traffic attributes of the zone (e.g., an amount of bandwidth, a frame rate, a data rate, etc.) based on an appearance of the zone (e.g., colors, patterns, blinking features, etc.). The overlay may permit the user to interact with the overlay to select a zone, to adjust a size or shape of the selected zone, to merge or subdivide the selected zone, and/or to change traffic attributes associated with the selected zone. Interacting with the overlay, via desktop 115, may cause user device 110 to send a request, to CDS 180, to change a traffic rate (e.g., a data rate, a frame rate, a bandwidth utilization rate, etc.) of a traffic flow associated with the selected zone.

Base station 120 may include one or more network devices that receive, process, and/or transmit traffic, such as audio, video, text, and/or other data, destined for and/or received from user device 110. In an example implementation, base station 120 may be an eNB device and may be part of the LTE network. Base station 120 may receive traffic from and/or send traffic to network 190 via SGW 130 and PGW 150. Base station 120 may send traffic to and/or receive traffic from user device 110 via an air interface. One or more of Base stations 120 may be associated with a RAN, such as the LTE network. Base station 120 may modify a data rate, associated with a traffic flow, based on an instruction received from CDS 180.

SGW 130 may include one or more network devices, or other types of computation or communication devices, that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 130 may, for example, aggregate traffic received from one or more eNodeBs 120 and may send the aggregated traffic to network 190 via PGW 150. SGW 130 may also receive traffic from network 190 and may send the received traffic to user device 110 via base station 120. SGW 130 may modify a data rate, associated with a traffic flow, based on an instruction received from CDS 180.

MME 140 may include one or more computation or communication devices that gather, process, search, store, and/or provide information in a manner described herein. For example, MME 140 may perform operations associated with a handoff to and/or from the EPS. MME 140 may perform operations to register user device 110 with the EPS, to handoff user device 110 from the EPS to another network, to handoff a user device 110 from the other network to the EPS, and/or to perform other operations. MME 140 may perform policing operations on traffic destined for and/or received from user device 110.

PGW 150 may include one or more network devices that gather, process, search, store, and/or provide information in a manner described herein. PGW 150 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 150 may include a device that aggregates traffic received from one or more SGWs 130, etc. and may send the aggregated traffic to network 190. PGW 150 may also receive traffic from network 190 and may send the traffic toward user device 110 via SGW 130. PGW 150 may modify a data rate, associated with a traffic flow, based on an instruction received from CDS 180.

HSS/AAA server 155 may include one or more server devices, or other types of computation or communication devices, that gather, process, search, store, and/or provide information in a manner described herein. For example, HSS/AAA server 155 may manage, update, and/or store, in a memory associated with HSS/AAA server 155, profile information associated with user device 110 that identifies applications and/or services that are permitted for and/or accessible by user device 110, bandwidth or data rate thresholds associated with the applications or services, information associated with a user of user device 110 (e.g., a username, a password, a personal identification number (PIN), etc.), rate information, minutes allowed, and/or other information. Additionally, or alternatively, HSS/AAA server 155 may include a device that performs authentication, authorization, and/or accounting (AAA) operations associated with a communication session with user device 110.

CSCF server 160 may include one or more server devices, or other types of computation or communication devices, that gather, process, search, store, and/or provide information in a manner described herein. CSCF server 160 may process and/or route calls to and from user device 110 via the EPC. For example, CSCF server 160 may process calls, received from network 190, that are destined for user device 110. In another example, CSCF server 160 may process calls, received from user device 110, that are destined for network 190.

Administrative server 170 may include one or more server devices, or other types of computation or communication devices, that gather, process, search, store, and/or provide information in a manner described herein. Administrative server 170 may, for example, establish a connection with user device 110 to establish a remote communication session with user device 110. Administrative server 170 may, as a result of establishing the connection, obtain information associated with desktop 115 being displayed by user device 110. Administrative server 170 may also, or alternatively, provide virtual desktop 175, for display on a display device associated with administrative server 170, based on the information associated with desktop 115. Virtual desktop 175 may permit an operator, of administrative server 170, to communicate with user device 110, interact with an operating system running on user device 110, and/or interact with applications, accessible via desktop 115, as though the operator was a user of user device 110.

Administrative server 170 may communicate with user device 110 to obtain traffic information corresponding to desktop 115. Administrative server 170 may, in a manner similar to that described above, identify one or more zones associated with desktop 115 based on the traffic information. Administrative server 170 may provide, for display via virtual desktop 175, an overlay that identifies the zones and/or permits the operator, of administrative server 170, to interact with the overlay to select a zone, to adjust a size or shape of the selected zone, to merge or subdivide the selected zone, and/or to change traffic attributes associated with the selected zone. Interacting with the overlay, via virtual desktop 175, may cause administrative server 170 to send a request, to CDS 180, to change a traffic rate (e.g., a data rate, a frame rate, a bandwidth utilization rate, etc.) of a traffic flow, associated with the selected zone, being sent to and/or received from user device 110. Changing the traffic rate may enable the operator to interact with virtual desktop 175 in a manner that improves performance of an operation on user device 110 over performance of that operation prior to the data rate being changed.

CDS 180 may include one or more server devices, or other types of computation or communication devices, that gather, process, search, store, and/or provide information in a manner described herein. CDS 180 may control a manner in which traffic, being outputted by content provider 185 and/or some other device, is transmitted to user device 110. For example, CDS 180 may receive, from administrative server 170 and/or user device 110, an instruction to reduce a traffic rate (e.g., a data rate, a bandwidth utilization rate, a frame rate, an update rate, etc.) associated with a particular traffic flow being transmitted to user device 110. CDS 180 may, in response to the instruction, reduce the traffic rate associated with the traffic flow to user device 110. CDS 180 may also, or alternatively, cause a quantity of frames (e.g., a single frame, two frames, etc.) associated with a flow of traffic, to be provided user device 110 based on an instruction received from administrative server 170 and/or user device 110. CDS 180 may also, or alternatively, cause a traffic flow, being provided to user device 110, to be temporarily stopped based on an instruction received from administrative server 170 and/or user device 110. CDS 180 may, when controlling the flow of traffic, send an instruction to content provider 185, PGW 150, SGW 130, and/or base station 120 to control the traffic rate associated with a traffic flow being transmitted to user device 110.

Content provider 185 may include one or more server devices, or other types of computation or communication devices, that provide any type or form of content. For example, content provider 185 may provide free television broadcasts (e.g., local broadcasts, such as NBC, CBS, ABC, and/or Fox), for-pay television broadcasts (e.g., TNT, ESPN, HBO, Cinemax, CNN, etc.), and/or Internet-based content (e.g., Youtube, Vimeo, Netflix, Hulu, Veoh, etc.) streamed from web sites. Content provider 185 may produce media streams (e.g., television broadcasts). A "media stream," as used herein, may refer to stream of content that includes video content (e.g., a video stream), audio content (e.g., an audio stream), textual content (e.g., a textual stream), and/or a combination of the aforementioned content. Content provider 185 may provide web pages, documents, images, advertising content, etc. Content provider 185 may provide applications and/or services, such as games, scripts, messaging services, etc.

Network 190 may include one or more wired and/or wireless networks. For example, network 190 may include a cellular network, a public land mobile network (PLMN), a second generation (2G) network, a third generation (3G) network, a fourth generation (4G) network, a fifth generation (5G) network, and/or another network. Additionally, or alternatively, network 190 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

FIG. 2A is a diagram of example components of a device 200. Device 200 may correspond to user device 110, SGW, 130, MME 140, PGW 150, HSS/AAA server 155, CSCF server 160, administrative server 170, CDS 180, and/or content provider 185. Alternatively, or additionally, each of user device 110, SGW 130, MME 140, PGW 150, HSS/AAA server 155, CSCF server 160, administrative server 170, CDS 180, and/or content provider 185 may include one or more devices 200 and/or one or more components of device 200.

Device 200 may include a bus 210, a processor 220, a memory 230, an input component 240, an output component 250, and a communication interface 260. Although FIG. 2A shows example components of device 200, in other implementations, device 200 may contain fewer components, additional components, different components, or differently arranged components than depicted in FIG. 2A. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications, wired communications, or a combination of wireless and wired communications. For example, communication interface 260 may include mechanisms for communicating with another device or system via a network, such as network 190. In one alternative implementation, communication interface 260 may be a logical component that includes input and output ports, input and output systems, and/or other input and output components that facilitate the transmission of data to other devices.

As described herein, device 200 may perform certain operations associated with controlling traffic flows associated with applications that are accessible via desktop 115 associated with user device 110. Device 200 may perform these and other operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 2B:
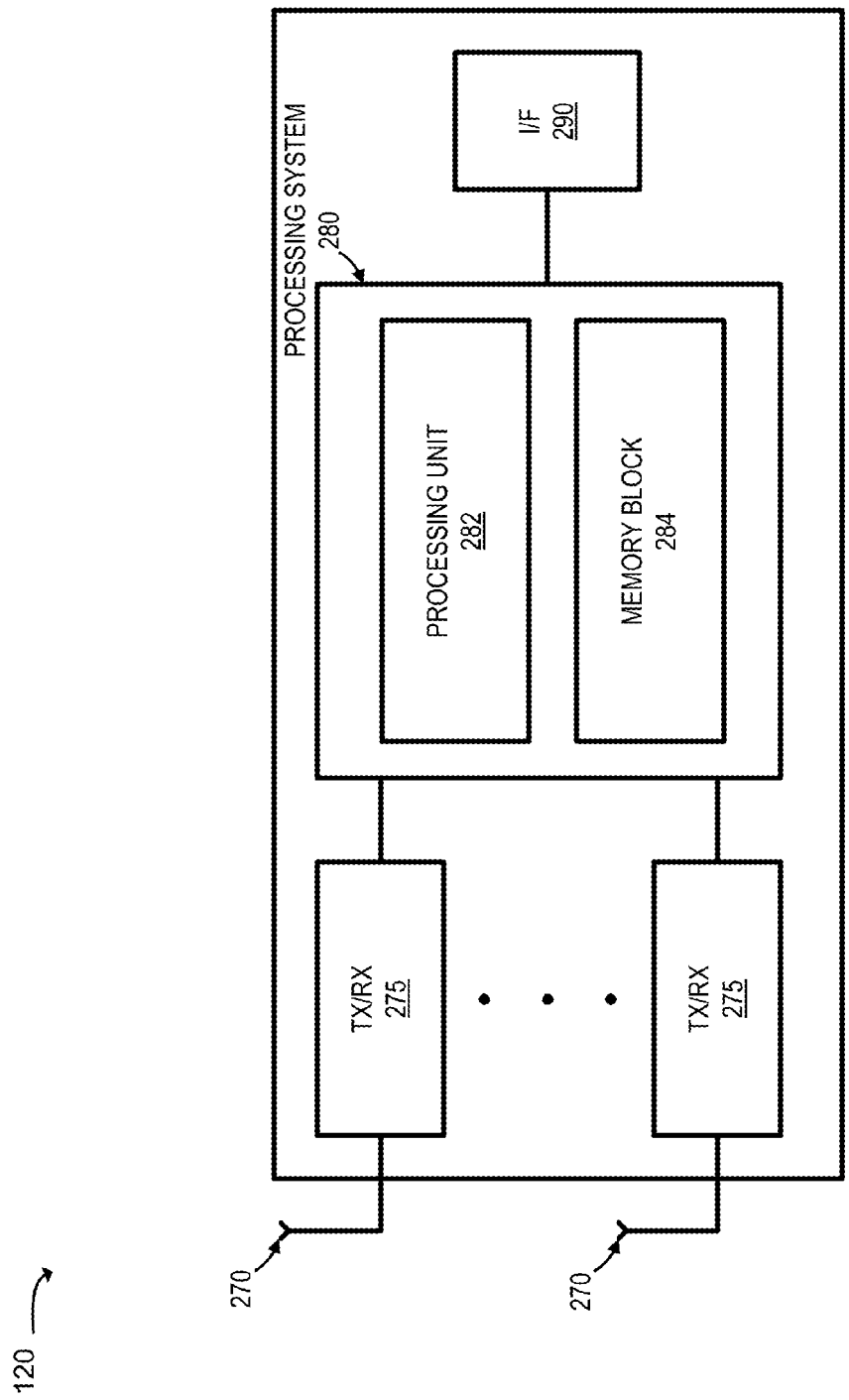
FIG. 2B is a diagram of example components of an eNodeB of FIG. 1.

FIG. 2B is a diagram of example components of base station 120 according to an implementation described herein. As shown in FIG. 2B, base station 120 may include antennas 270, transceivers (TX/RX) 275, processing system 280, and interface (I/F) 290. Base station 120 may include fewer components, additional components, different components, and/or differently arranged components than those illustrated in FIG. 2B. Additionally, or alternatively, one or more operations described as being performed by a particular component of base station 120 may be performed by one or more other components, in addition to or instead of the particular component of base station 120.

Antennas 270 may include one or more directional and/or omnidirectional antennas. Transceivers 275 may be associated with antennas 270 and include transceiver circuitry for transmitting and/or receiving traffic within a network, such as a wireless network, via antennas 270.

Processing system 280 may control the operation of base station 120. Processing system 280 may also process information received via transceivers 275 and Iub interface 290. Processing system 280 may further measure quality and strength of connection and determine a frame error rate (FER), and transmit this information to MME 140 and/or some other device. As illustrated, processing system 280 may include a processing unit 282 and a memory block 284. It will be appreciated that processing system 280 may include fewer components, additional components, different components, and/or differently arranged components than illustrated in FIG. 2B.

Processing unit 282 may process information received via transceivers 275 and interface 290. The processing may include, for example, data conversion, forward error correction (FEC), rate adaptation, Wideband Code Division Multiple Access (WCDMA) spreading/dispreading, and quadrature phase shift keying (QPSK) modulation, etc. In addition, processing unit 282 may generate control messages and/or data messages (e.g., within high speed-downlink shared channel (HS-DSCH) data frames) and cause those control messages and/or data messages to be transmitted via transceivers 275 and/or interface 290. Processing unit 282 may also process control messages and/or data messages received from transceivers 275 and/or interface 290.

Memory block 284 may store information (e.g., in the form of protocol data units (PDUs)) to be transmitted to and/or that has been received from user device 110. In one embodiment, each user device 110 associated with base station 120 may be associated with one or more priority queues from memory block 284. A priority queue may, for example, be initialized for user device 110 when a media access control-d (MAC-d) flow is established for that user device 110.

Memory block 284 may map received logical channel identifiers to priority queue identifiers. In one embodiment, a HS-DSCH framing protocol type 2 data frame may associate one or more logical channel identifiers with one or more PDUs stored in the data frame. Base station 120 may use the logical channel identifiers to identify the appropriate priority queues from memory block 284 for storing the PDUs.

Interface 290 may include one or more input/output components that allow base station 120 to transmit data to and receive data from SGW 130, MME 140, CDS 180, etc.

FIG. 3 is a diagram of an example data structure 300 that may store traffic information corresponding to desktop 115 associated with user device 110. Data structure 300 may be stored in a memory associated with user device 110 and/or administrative server 170. As illustrated in FIG. 3, data structure 300 may include a collection fields, such as a user device information (info) field 305, a zone identifier (ID) field 310, a zone info field 315, an application info field 320, a content type field 325, a traffic rate field 330, and a content states field 335. The quantity of fields within data structure 300 is provided for explanatory purposes. In another implementation, there may be additional fields, fewer fields, different fields, or differently arranged fields than are shown in FIG. 3.

User device info field 305 may store information associated with user device 110 with which desktop 115 is associated. The information, associated with user device 110, may include a device identifier (e.g., a mobile directory number (MDN), a landline directory number (LDN), etc.), a network address (e.g., an Internet protocol (IP) address, a media access control (MAC) address, etc.), information associated with a user of user device 110 (e.g., a username, password, personal identification number (PIN), etc.), etc. Zone ID field 310 may store information that uniquely identifies a particular zone (e.g., a zone name, identifier, etc.) associated with desktop 115.

Zone info field 315 may store information associated with the particular zone. For example, the information, associated with the particular zone, may identify dimensions of the particular zone (e.g., length and width in inches, quantity of pixels, centimeters, etc.) and/or a position, of the particular zone, within desktop 115 (e.g., coordinates associated with the particular zone relative to coordinates and/or dimensions associated with desktop 115. Additionally, or alternatively, the zone information may include information associated with the appearance attributes of the particular zone, within desktop 115, such as border colors, patterns, thickness, etc.; font colors, types, sizes, etc.; zone area (e.g., within the borders) colors, patterns, etc.; and/or other appearance attributes (e.g., buttons, icons, blinking features, etc.).

Application info field 320 may store information associated with an application (e.g., an application name, identifier, etc.) and/or traffic flow (e.g., an access programming name (APN), a packet data network (PDN), a port identifier, etc.) with which the particular zone is associated. For example, application info field 320 may store information that identifies an application when the particular zone corresponds to a user interface, open within desktop 115, associated with the application. Additionally, or alternatively, application info field 320 may store information that identifies an operating system, running on user device 110, when the particular zone corresponds to an area of desktop 115 where no applications are open and/or that includes buttons or fields associated with the operating system (e.g., a desktop background, a toolbar, a taskbar, an icon associated with an application, etc.). Additionally, or alternatively, application info field 320 may store information that identifies a traffic flow, when the particular zone corresponds to an application, open within desktop 115, that is sending and/or receiving the traffic flow.

Content type field 325 may store information that identifies a type of content (e.g., image content, textual content, video content, advertising content, an icon, desktop background, etc.) being displayed within the borders of the particular zone. Traffic rate field 330 may store information that identifies a traffic rate, corresponding to a traffic flow (e.g., a data rate, a bandwidth utilization rate, a frame rate, an update rate, etc.), associated with the particular zone.

Content states field 335 may store information that identifies states associated with content that is displayed, via desktop 115, within the particular zone. For example, an object, within the particular zone (e.g., an icon, a button, an image, etc.), may have one or more states that are repeatedly displayed. For example, the object may repeatedly appear with a first color (e.g., green) at one instance and changes to a second color (e.g., red) at another instance. A first state, associated with the object, may correspond to the first color and a second state, associated with the object, may correspond to the second color. Additionally, or alternatively, an area, within the particular zone, may repeatedly include one or more of a set of images, such as a first image at a first instance, a second image at a second instance, and a third image at a third instance. In this example, a first state, associated with the area, may correspond to the first image, a second state may correspond to the second image, and a third state may correspond to the third image.

Figure 4:
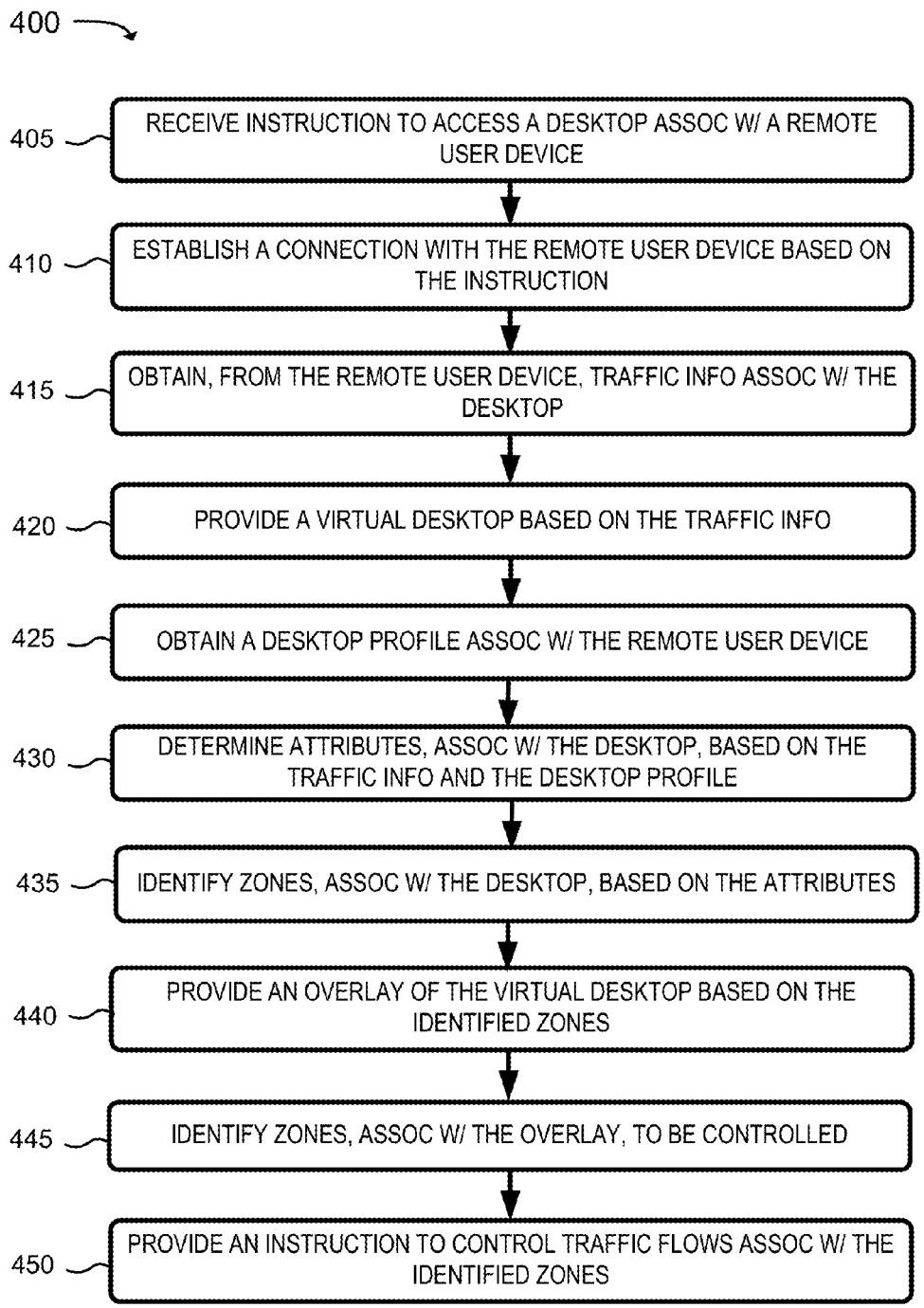
FIG. 4 is a flow chart of an example process for controlling traffic that may be transmitted to a remote user device based on traffic information corresponding to a desktop associated with the remote user device.
Figure 5A:
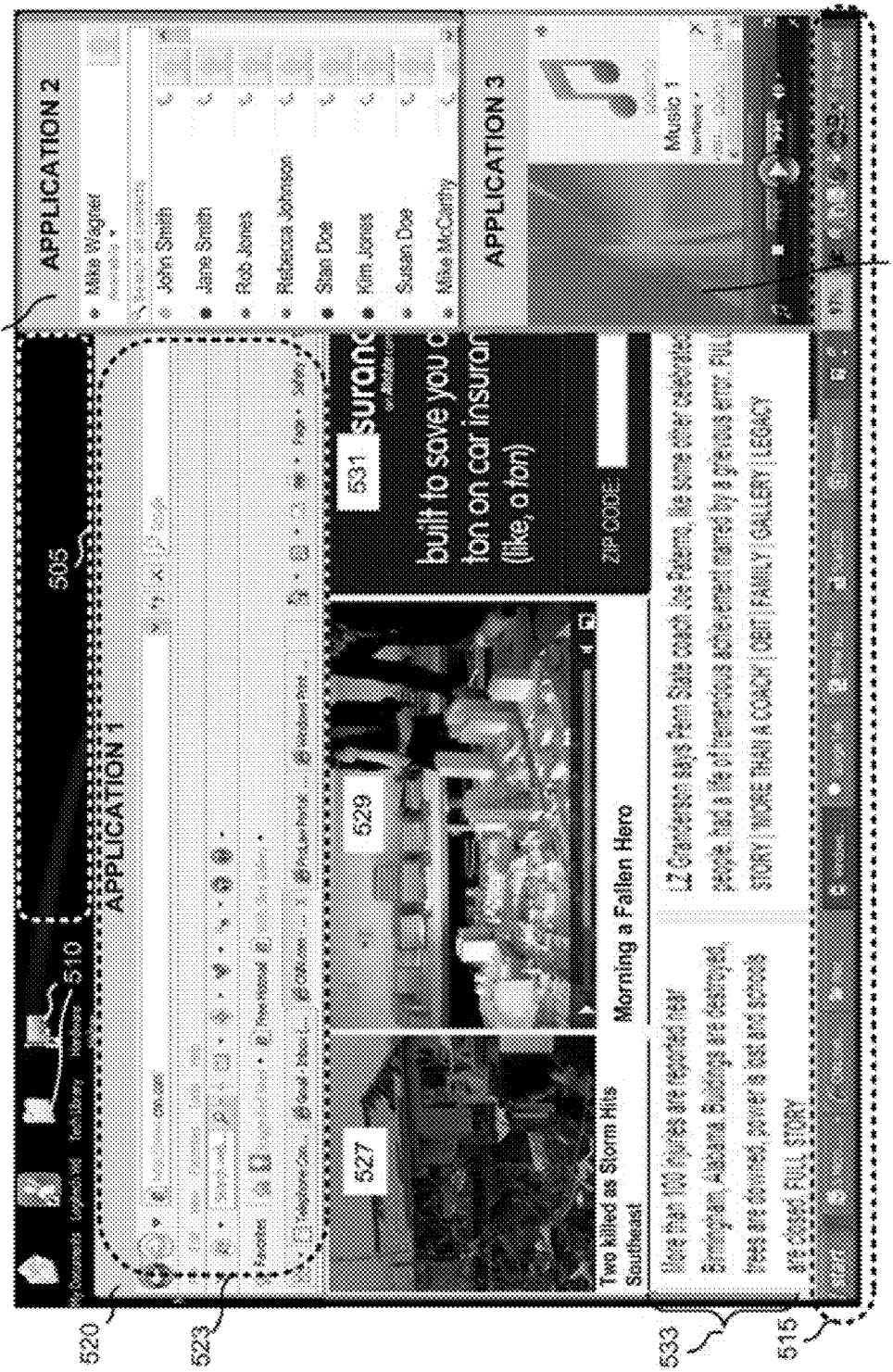

FIG. 4 is a flow chart of an example process 400 for controlling traffic that may be transmitted to a remote user device 110 based on traffic information corresponding to desktop 115 associated with remote user device 110. In an example implementation, process 400 may be performed by administrative server 170. In another example implementation, some or all of process 400 may be performed by a device or collection of devices separate from, or in combination with administrative server 170. FIGS. 5A and 5B are diagrams of an example desktop 500 that may be associated with user device 110. In the description below, all or a portion of process 400 of FIG. 4 will be described with references to desktop 500 of FIGS. 5A and 5B.

As shown in FIG. 4, process 400 may include receiving an instruction to access a desktop associated with a remote user device (block 405) and establishing a connection with the remote user device based on the instruction (block 410). For example, an operator, associated with administrative server 170, may desire to perform an operation on user device 110 (e.g., troubleshoot a problem, update software, etc.) associated with a location that is remote from administrative server 170. The operator may instruct administrative server 170 to establish a connection with user device 110 to allow administrative server 170 to access desktop 115 associated with user device 110. Additionally, or alternatively, administrative server 170 may use a remote desktop protocol (e.g., Remote Desktop Control (RDC) protocol, virtual desktop control (VDC) protocol, etc.) to communicate with user device 110 and/or to access desktop 115.

As also shown in FIG. 4, process 400 may include obtaining, from the remote user device, traffic information associated with the desktop (block 415) and providing a virtual desktop based on the traffic information (block 420). For example, administrative server 170 may, as a result of establishing the connection, monitor traffic being transmitted and/or received by user device 110. Additionally, or alternatively, administrative server 170 may access a desktop (e.g., desktop 115) being displayed on user device 110.

As shown in FIG. 5A, desktop 500 may include a collection of objects such as a background object 505, icon objects 510, a control bar object 515, and user interface objects 520. The quantity of objects included in desktop 500 are provided for explanatory reasons. In another implementation, there may be fewer objects, additional objects, different objects, and/or differently arranged objects. Desktop 500 may correspond to desktop 115 associated with user device 110. Additionally, or alternatively, desktop 500 may be presented, as virtual desktop 175 associated with desktop 115, for display on a display device associated with administrative server 175.

Background object 505 may correspond to an area of background that is not covered by another object. Background object 505 may be provided, for display, by an operating system running on user device 110. Background object 505 may cover a majority of screen area, associated with user device 110 and/or a display associated with administrative server 170 when, no applications and/or user interfaces are open and/or cover background 505.

Icon object 510 may include a graphic image, symbol, etc. that corresponds to an application, a file, an electronic folder, a document, an instruction, etc. Icon object 510 may, when selected by a user of user device 110 and/or an operator of administrative server 170 (e.g., using a pointing device, such as a mouse), allow an application, to which icon object 510 corresponds, to be opened and/or executed by user device 110. In another example, selecting icon object 510 may allow a folder to be opened and other icon objects 510 to be provided that correspond to documents and/or other folders stored within the folder.

Control bar object 515 may include one or more buttons that, when selected by the user or operator, allow an operating system, running on user device 110, to be controlled. In one example, control bar object 515 may represent a task bar that includes buttons that correspond to applications that have been opened on desktop 500 and/or that are being executed by user device 110. Selecting one of the buttons may cause a user interface, associated with one of the applications, to be displayed at the front of via desktop 500 (e.g., in a manner that is not blocked or covered by another user interface).

User interface object 520 may represent a user interface associated with an application (e.g., a web browser, a word processor, a game, an email application, etc.) that is opened on desktop 500. User interface object 520 may be associated with one or more flows of traffic being transmitted and/or received, by user device 110, if the application, with which user interface object 520 is associated, is communicating with network 190. User interface object 520 may include a control object 523 that includes one or more buttons, menus, fields, etc. that allow the user and/or the operator to interact with the application (e.g., as shown by dashed rectangle 523). Additionally, or alternatively, user interface object 520 may represent a browser (e.g., shown as application 1) that is communicating with network 190 to obtain content associated with an image object 527, a video object 529, an advertising object 531, a text object 533, etc.

Image object 527 may include an image and/or a caption, associated with the image, received from content provider 185. Image object 527 may be associated with a first traffic rate (e.g., an update rate, a frame rate, etc.) based on a rate at which the image and/or caption is updated by content provider 185. Additionally, or alternatively, image object 527 may be associated with one or more content states based on a quantity of images and/or captions displayed during a period of time. Video object 529 may include video content and/or a caption, associated with the video content, received from content provider 185. Video object 529 may be associated with a second traffic rate (e.g., a frame rate, a data rate, etc.) that corresponds to the video content being streamed, progressively downloaded, etc. to user device 110.

Advertising object 531 may include an image, graphics, text, video content, a script, etc. associated with advertising content received from content provider 185. Advertising object 531 may be associated with a third traffic rate that is based on a rate at which the image, graphics, text, video content, a script, etc. are updated and/or transmitted to user device 110. Advertising object 531 may also, or alternatively, be associated with one or more content states based on a quantity of different images, text, graphics etc. that are downloaded and/or provided to user device 110. Text object 533 may include textual content (e.g., associated with a news article, etc.) received from content provider 185. Text object 533 may be associated with a fourth data rate based on a rate at which the text is downloaded and/or updated by content provider 185. Additionally, or alternatively, text object 533 may be associated with one or more content states based on a quantity of sets of text displayed during a period of time.

Desktop 500 may include another user interface object 520 associated with another application (e.g., shown as application 2, application 3, etc. in FIG. 5A). The other interface object 520 may be associated with one or more other traffic flows if the other application is communicating with network 190.

Returning to FIG. 4, administrative server 170 may obtain, from user device 110, traffic information associated with desktop 115. For example, administrative server 170 may obtain information associated with each of the objects associated with desktop 115 (e.g., dimensions, locations within desktop 115, etc.). Additionally, or alternatively, administrative server 170 may obtain information associated with objects that are located within each of the user interface objects 520. Additionally, or alternatively, administrative server 170 may identify content states and/or traffic rates (e.g., data rates, bandwidth utilization rates, frame rates, update rates, etc.) associated with the objects located within user interface object 520.

Administrative server 170 may provide, for display on a display associated with administrative server 170, a virtual desktop (e.g., virtual desktop 175) based on the traffic information. An operator, of administrative server 170, may interact with virtual desktop 175 to access, control, and/or perform operations on user device 110 using a remote desktop protocol (e.g., RDC, VDC, etc.) and/or some other protocol.

As further shown in FIG. 4, process 400 may include obtaining a desktop profile associated with the remote user device (block 425) and determining attributes, associated with the desktop, based on the traffic information and the desktop profile (block 430). For example, administrative server 170 may retrieve a desktop profile associated with user device 110. In one example, administrative server 170 may communicate with HSS/AAA server 155 to obtain the desktop profile associated with user device 110. In another example, administrative server 170 may retrieve a desktop profile from a memory associated with administrative server 170. The desktop profile may identify one or more traffic thresholds to be used to generate an overlay for desktop 115. The traffic thresholds may be used to assign a category to an object, identified by the traffic information, based on a traffic rate associated with a traffic flow corresponding to the object and a traffic threshold identified by the desktop profile. Traffic thresholds for a first type of user device 110 may be different than traffic thresholds for a different type of user device 110. Additionally, or alternatively, the desktop profile may include traffic thresholds that are set by a user of user device 110 and/or an operator of administrative server 170.

Administrative server 170 may determine attributes, associated with desktop 115, based on the traffic information and the desktop profile. For example, administrative server 170 may compare a first traffic rate associated with a first object, identified by the traffic information, to a first threshold obtained from the desktop profile. Based on a determination that first traffic rate is less than the first threshold, administrative server 170 may assign the first object to a first category. If, however, administrative server 170 determines that the first traffic rate is not less than the first threshold, then administrative server 170 may compare the first traffic rate to a second threshold obtained from the desktop profile. Based on a determination that first traffic rate is less than the second threshold, administrative server 170 may assign the first object to a second category. If, however, administrative server 170 determines that the first traffic rate is not less than the second threshold, then administrative server 170 may assign the object to a third category. In this example, the first threshold may be less than the second threshold. Administrative server 170 may assign a category to each object within desktop 115 in a manner similar to that described above.

As yet further shown in FIG. 4, process 400 may include identifying zones, associated with the desktop, based on the attributes (block 435) and providing an overlay of the virtual desktop based on the zones (block 440). For example, administrative server 170 may identify zones, associated with desktop 115, based on the traffic information and/or categories assigned to the zones. Administrative server 170 may identify zones based on the objects included within desktop 115, and/or traffic rates and/or categories associated with the objects. Administrative server 170 may, for example, create a respective zone that corresponds to each user interface (e.g., each user interface object 520 of FIG. 5A) that is open within desktop 115. Additionally, or alternatively, administrative server 170 may create a respective zone that corresponds to each icon or group of icons (e.g., icon objects 510 of FIG. 5A) that are included within desktop 115; each area of desktop 115 associated with a desktop background (e.g., background object 505 of FIG. 5A); and/or each control button or group of control buttons (e.g., control bar object 515 of FIG. 5A) included within desktop 115.

Administrative server 170 may also, or alternatively, subdivide a zone and/or create smaller zones based on objects within an identified zone and/or different traffic rates and categories associated with the objects. For example, administrative server 170 may determine that a zone, associated with a user interface, includes one or more objects (e.g., control object 523, image object 527, video object 529, advertising object 531, text object 533, etc. of FIG. 5A) associated with different traffic rates and/or that have been assigned different categories. Administrative server 170 may, in one example, determine that video object 529 is associated with a traffic rate that is greater than traffic rates associated with other objects within the zone. Additionally, or alternatively, administrative server 170 may determine that video object 529 is associated with a category that is different than categories associated with the other objects. Administrative server 170 may identify a zone, associated with video object 529, based on the determination that the traffic rate that is greater than traffic rates associated with the other objects and/or that the category is different than categories associated with the other objects. Additionally, or alternatively, administrative server 170 may combine two or more adjacent zones into a single zone based on a determination that the adjacent zones are associated with a same category and/or are associated with one or more traffic rates that are approximately the same.

Administrative server 170 may associate a category with a zone based on a category assigned to an object on which the zone is based. Additionally, or alternatively, when two or more objects are included within a zone, administrative server 170 may associated a category with the zone based on a combination of traffic rates associated with the objects included within the zone. In one example, administrative server 170 may determine a combined traffic rate for the zone based on an average of the traffic rates associated with the objects within the zone. Administrative server 170 may also, or alternatively, associate a category with the zone based on the combined traffic rate relative to the thresholds (e.g., the first threshold and/or the second threshold) identified by the desktop profile in a manner similar to that described above with respect to block 430.

Additionally, or alternatively, administrative server 170 may identify dimensions and/or positions associated with zones identified within desktop 115. Administrative server 170 may, for example, identify dimensions (e.g., length, width, etc.) and/or a position, associated with an object, relative to a reference point associated with desktop 115 (e.g., an edge, a corner, a center location, etc.). Administrative server 170 may determine dimensions and/or a position of a zone based on the dimensions and/or position of the object. Administrative server 170 may determine an aggregate position and/or dimensions of two or more objects, associated with a zone, based on positions and/or dimensions, associated with each of the two or more objects, respectively. Administrative server 170 may associate the aggregate position and/or dimensions with the zone. Administrative server 170 may also, or alternatively, associate traffic information, associated with the objects, with the zone.

Administrative server 170 may also, or alternatively, associate appearance attributes (e.g., color, patterns, etc.) with each of the zones based on a respective category associated with each of the zones. Administrative server 170 may, in one example, associate first appearance attributes (e.g., a green border color, a solid pattern, etc.) with a zone associated with a first category. Additionally, or alternatively, administrative server 170 may associate second appearance attributes (e.g., an amber border color, a solid pattern, etc.) with a zone associated with a second category. Additionally, or alternatively, administrative server 170 may associate third appearance attributes (e.g., a red border color, a solid pattern, etc.) to a zone associated with a third category. Administrative server 170 may create an overlay (e.g., overlay 550 of FIG. 5B), associated with desktop 115, based on the identified zones and the appearance attributes associated with each of the zones. Administrative server 170 may provide the overlay, for display, via virtual desktop 175.

As shown in FIG. 5B, overlay 550 may include a collection of zones, associated with desktop 500 of FIG. 5A, such as zones 555-1, . . . 555-9 (hereinafter referred to collectively as "zones 555" and individually as "zone 555"). The quantity of zones, included within overlay 550, are provided for explanatory purposes only. In another implementation, there may be additional zones, fewer zones, different zones, or differently arranged zones than are shown in overlay 550.

Zone 555 may correspond to a portion of an area, associated with desktop 500, in which one or more objects are located. For example, zone 555-1 may correspond to a desktop background object 505 and/or one or more icon objects 510 included within desktop 500. Zone 555-1 may include appearance attributes (e.g., a green color, a solid pattern, etc.) that correspond to a combined traffic rate that is less than a first threshold and/or is associated with a first category. Zones 555-2-555-6 may represent zones that have been subdivided from a zone, associated with user interface object 520, that corresponds to an application (e.g., a browser) open within desktop 500. Zones 555-2 and 555-6 may, for example, correspond to control object 523 and text object 533, associated with the application, respectively. Zones 555-2 and 555-6 may include appearance attributes that correspond to a traffic rate that is less than a first threshold and/or is associated with the first category.

Zones 555-3 and 555-5 may correspond to image object 527 and advertising object 531, associated with the application, respectively. Zones 555-3 and 555-5 may include appearance attributes (e.g., an amber color, a solid pattern, etc.) that correspond to a traffic rate that is not less than the first threshold and is less than a second threshold, and/or is associated with a second category. Zone 555-4 may correspond to video object 529 associated with the application. Zone 555-4 may include appearance attributes (e.g., a red color, solid pattern, etc.) that correspond to a traffic rate that is not less than the second threshold and/or is associated with a third category.

Overlay 550 may, in a manner similar to that described above, include other zones (e.g., zones 555-8 and 555-9) associated with other objects (e.g., user interface objects 520, etc.) included within desktop 500.

Returning to FIG. 4, process 400 may include identifying a zone, associated with the overlay, to be controlled (block 445) and providing an instruction to control a traffic flow associated with the identified zone (block 450). For example, administrative server 170 may identify a zone associated with a category and may determine that a traffic flow, associated with the identified zone, is to be controlled. In one example, administrative server 170 may determine that a traffic flow, associated with zone 555-4 (FIG. 5B), is to be controlled based on a third category with which zone 555-4 is associated and/or a traffic rate, associated with zone 555-4, that is not less than the second threshold. Administrative server 170 may provide, to CDS 180, an instruction to reduce the traffic flow to a traffic rate that is less than a threshold (e.g., the second threshold, the first threshold, or some other threshold). In another example, administrative server 170 may provide, to CDS 180, an instruction to temporarily cause the traffic flow to stop being transmitted to user device 110.

Administrative server 170 may cause appearance attributes, associated with zone 555-4, to be changed based on the control of the traffic flow. For example, administrative server 170 may cause a color, associated with zone 555-4, to be changed to a different color (e.g., from a red color to an amber color, from an amber color to a green color, etc.) to alert an operator, of administrative server 170, that the traffic flow has been controlled. Additionally, or alternatively, administrative server 170 may cause a solid pattern, associated with zone 555-4, to be changed to a different pattern (e.g., a hashed pattern as shown by the diagonal lines within zone 555-4) to alert the operator that the traffic flow has been controlled in a particular manner (e.g., when the traffic flow is temporarily stopped). Administrative server 170 may, in a manner similar to that described above, cause traffic flows, associated with other zones (e.g., zones 555-3, 555-5, 555-9, etc.), to be controlled based on traffic rates and/or categories associated with the other zones. Additionally, or alternatively, the traffic flows may be controlled when the operator interacts with overlay 550 in a manner to be described in greater detail below with respect to FIG. 7.

Figure 6:
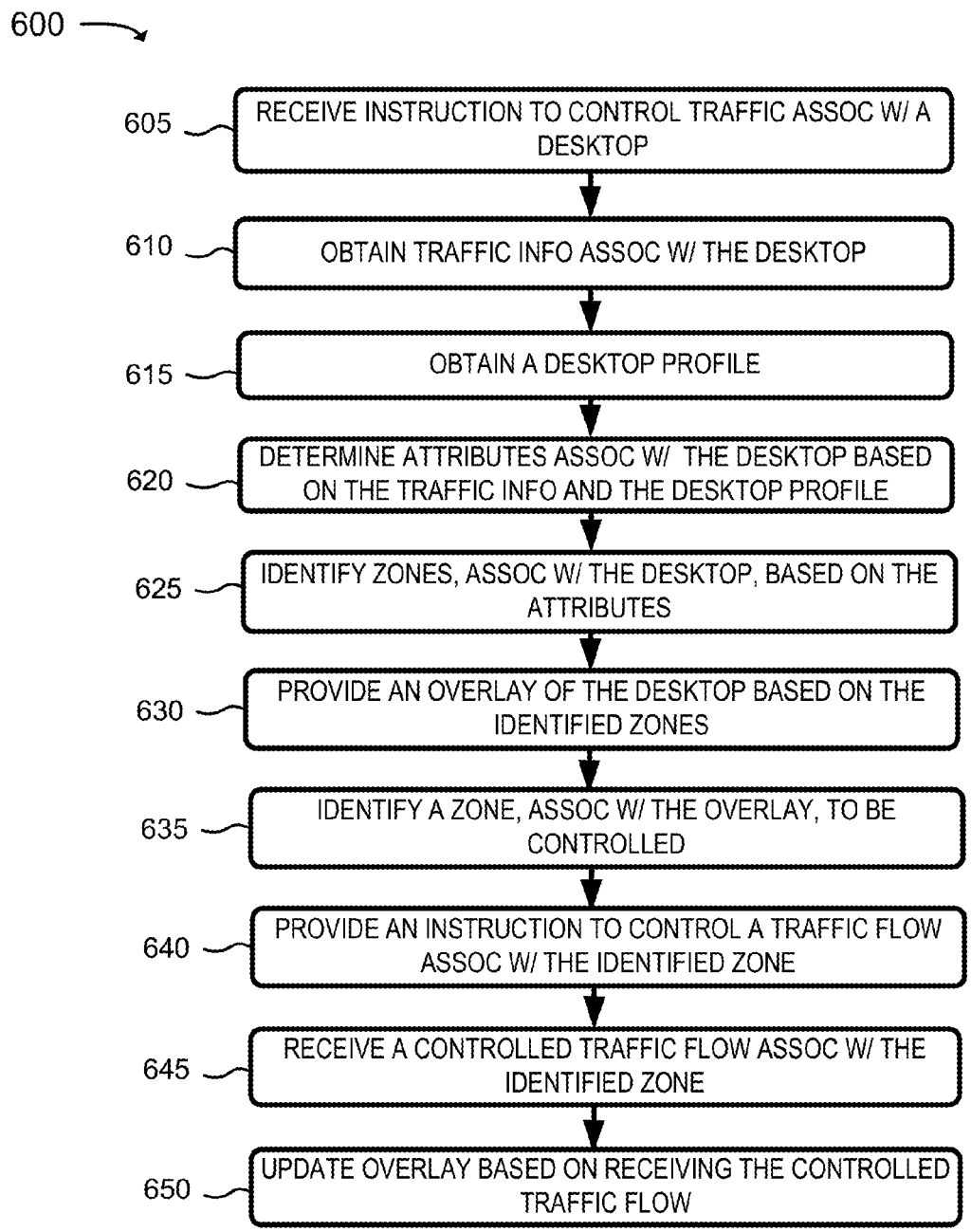
FIG. 6 is a flow chart of an example process for controlling traffic that may be transmitted to a user device based on traffic information corresponding to a desktop associated with the user device.

FIG. 6 is a flow chart of an example process 600 for controlling traffic that may be transmitted to user device 110 based on traffic information corresponding to a desktop 115 associated with the user device 110. In an example implementation, process 600 may be performed by user device 110. In another example implementation, some or all of process 600 may be performed by a device or collection of devices separate from, or in combination with user device 110.

As shown in FIG. 6, process 600 may include receiving an instruction to control traffic associated with a desktop (block 605) and obtaining traffic information associated with the desktop (block 610). For example, a user, of user device 110, may desire to perform an operation on user device 110 (e.g., to troubleshoot a problem, to install software, etc.) and may instruct user device 110 to open a client application, installed on user device 110, to be used to control the traffic. User device 110 may receive the instruction and may open the client application in response to the request.

User device 110 may use the client application to monitor one or more traffic flows being sent and/or received by one or more objects associated with desktop 115. User device 110 may, in a manner similar to that described above with respect to block 415 of FIG. 4, obtain traffic information associated with the one or more traffic flows. The traffic information identify the objects associated with desktop 115, traffic flows associated with the objects, and/or traffic rates associated with the traffic flows.

As also shown in FIG. 6, process 600 may include obtaining a desktop profile (block 615) and determining attributes associated with the desktop based on the traffic information and the desktop profile (block 620). For example, user device 110 may obtain, from a memory associated with user device 110, a desktop profile associated with desktop 115. The desktop profile may identify one or more traffic thresholds to be used to generate an overlay of desktop 115. The traffic thresholds may be used to assign categories to objects, within desktop 115, based on traffic rates, associated with the objects. The traffic thresholds may be predetermined by the client application. Additionally, or alternatively, user device 110 may retrieve the desktop profile from HSS/AAA server 155 and/or from administrative server 170.

User device 110 may, in a manner similar to that described above with respect to block 430 of FIG. 4, determine attributes, associated with desktop 115, based on the traffic information and the desktop profile. For example, user device 110 may identify traffic rates associated with objects included within desktop 115 and may assign categories (e.g., a first category, a second category, a third category, etc.) to the objects based on the traffic rates relative to the thresholds (e.g., the first threshold, the second threshold, etc.) identified by the desktop profile. User device 110 may assign categories to each of the objects based on a comparison of the traffic rates to the thresholds.

As further described in FIG. 6, process 600 may include identifying zones, associated with the desktop, based on the attributes (block 625) and providing an overlay of the desktop based on the identified zones (block 630). For example, user device 110 may, in a manner similar to that described above with respect to block 435 of FIG. 4, identify one or more zones, associated with desktop 115, based on the traffic information and/or categories assigned to one or more objects within desktop 115. A category and/or traffic rate, associated with an object may be associated with a zone that is based on the object. A zone, associated with two or more objects, may be associated with a combined traffic rate that is based on traffic rates associated with the objects and/or a category that is determined based on the combined traffic rate.

Additionally, or alternatively, user device 110 may subdivide a zone to create two or more zones associated with desktop 115 when an object, within a zone, is associated with a traffic rate and/or category that is different than traffic rates and/or categories associated with other objects within the zone. User device 110 may also, or alternatively, combine two or more adjacent zones when the adjacent zones are associated with a same category and/or a traffic rate that is approximately the same.

Additionally, or alternatively, user device 110 may identify dimensions and/or positions, associated with the zones, based on dimensions and/or positions, associated with objects on which the zones are based. User device 110 may also, or alternatively, identify appearance attributes (e.g., color, patterns, etc.) of the zones based on categories associated with the zones. User device 110 may create an overlay (e.g., overlay 550 of FIG. 5B), associated with desktop 115, based on the identified zones, the positions and/or dimensions of the zones, and/or the appearance attributes associated with the zones. User device 110 may provide the overlay, for display, via desktop 115.

As yet further shown in FIG. 6, process 600 may include identifying a zone, associated with the overlay, to be controlled (block 635) and providing an instruction to control a traffic flow associated with the identified zone (block 640). For example, user device 110 may identify a zone associated with a category that is to be controlled. Additionally, or alternatively, user device 110 may determine that a traffic rate, associated with a zone, is not less than a threshold (e.g., a second threshold, a first threshold, or some other threshold). Based on the determination that the traffic rate is not less than the threshold and/or that the zone is associated the category that is to be controlled, user device 110 may provide, to CDS 180, an instruction to reduce the traffic flow to a traffic rate that is less than the threshold. In another example, user device 110 may provide, to CDS 180, an instruction to temporarily cause the traffic flow to stop being transmitted to user device 110.

As still further shown in FIG. 6, process 600 may include receiving a controlled traffic flow associated with the identified zone (block 645) and updating the overlay based on receiving the controlled traffic flow (block 650). For example, CDS 180 may receive the instruction and may cause a traffic flow, identified by the instruction, to be transmitted to user device 110 at a traffic rate that is less than the threshold and/or may temporarily stop transmitting the traffic flow. User device 110 may receive the traffic flow at the reduced traffic rate and/or may stop receiving the traffic flow and may update an overlay associated with desktop 115. In one example, user device 110 may cause a solid pattern, associated with the zone to be changed to a different pattern (e.g., a hashed pattern) to alert a user, of user device 110, that the traffic flow has been controlled (e.g., when the traffic flow is temporarily halted). In another example, user device 110 may cause a color, associated with the zone, to be changed to a different color (e.g., from a red color to a yellow color, from a yellow color to a green color, etc.) to alert the user that the traffic flow has been controlled (e.g., when a traffic rate has been reduced). Additionally, or alternatively, the traffic flows may be controlled by the user when the user interacts with the overlay in a manner to be described in greater detail below with respect to FIG. 7.

Figure 7:
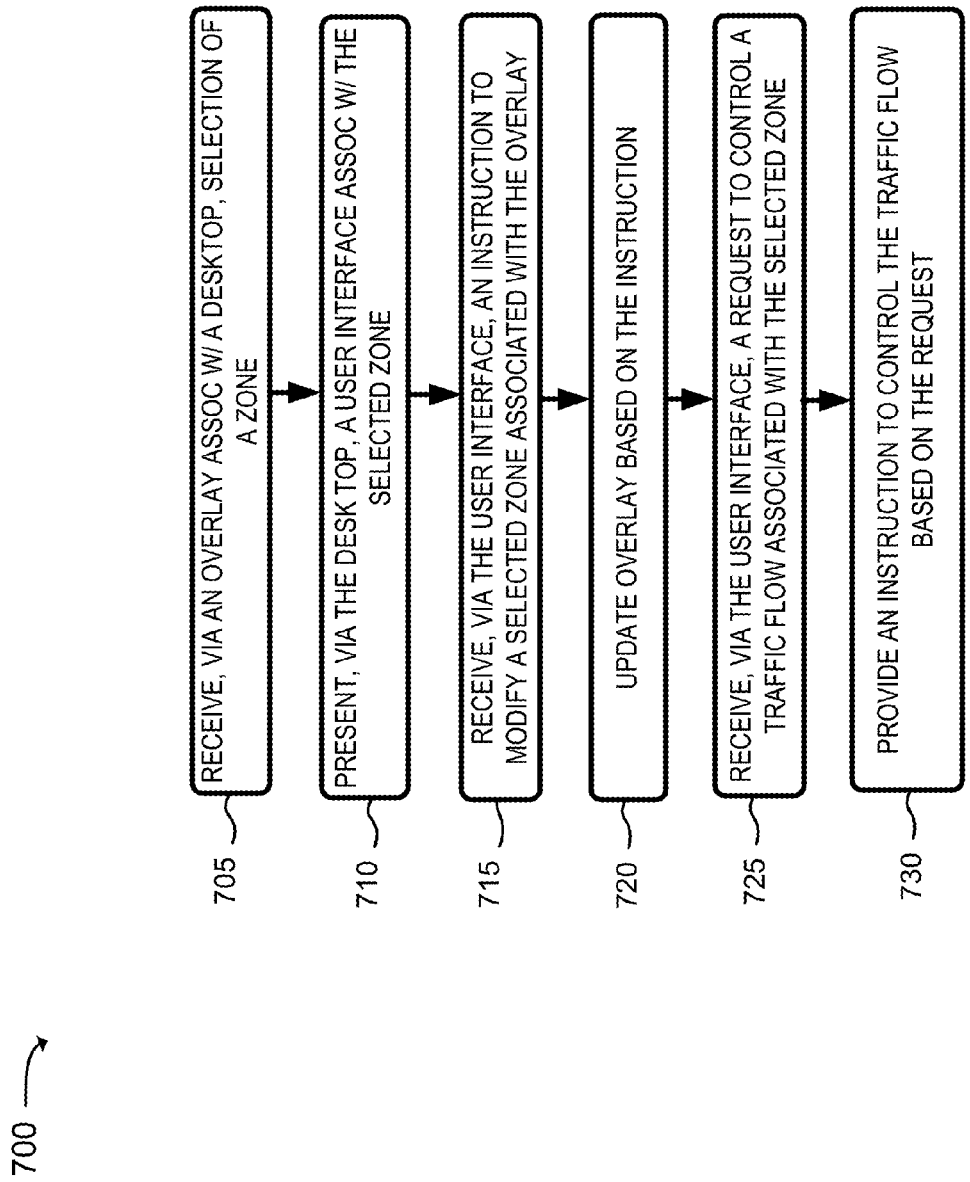
FIG. 7 is a flow chart of an example process for controlling traffic that may be sent to a user device based on instructions received via an overlay associated with a desktop.
Figure 8:
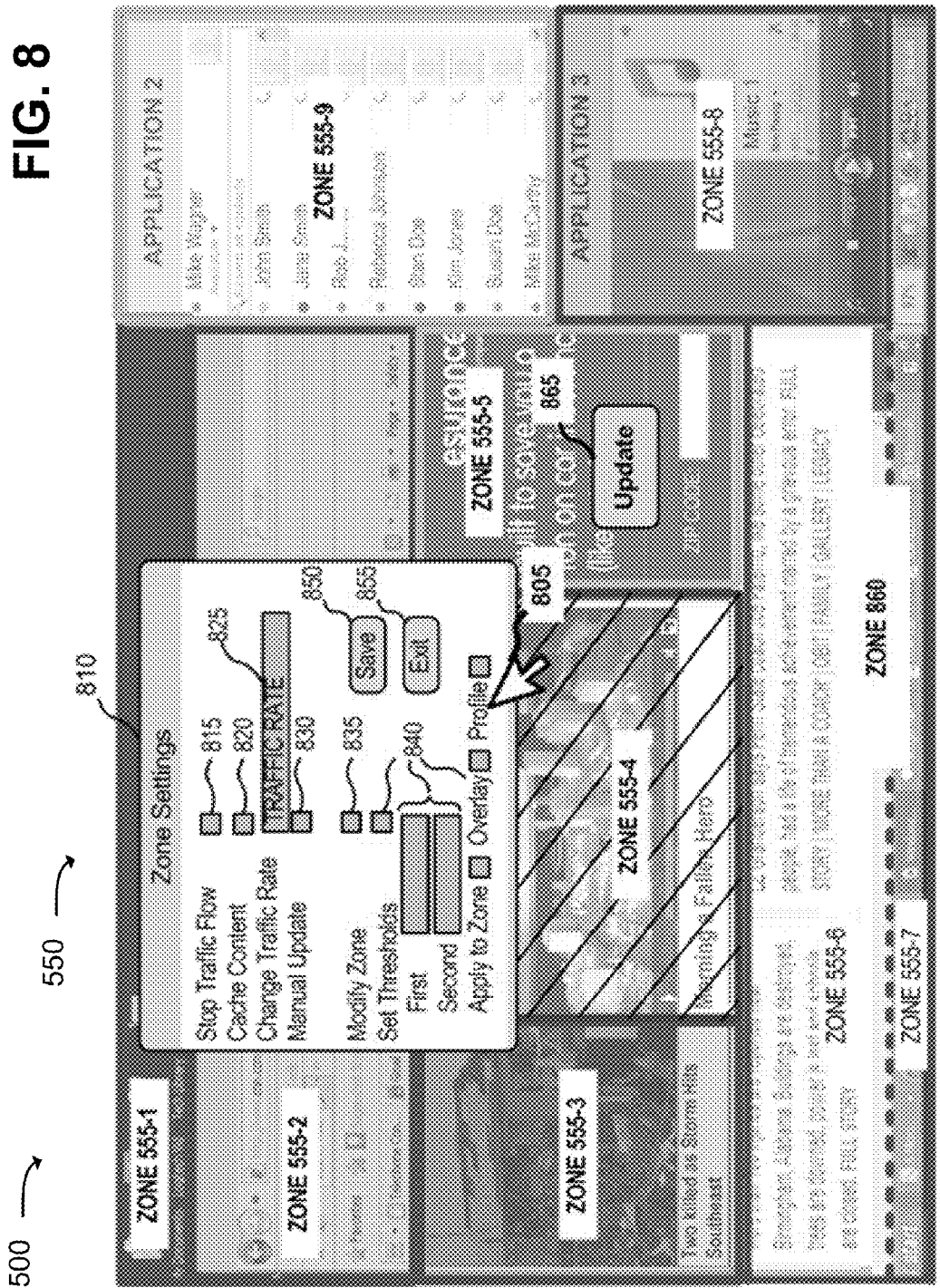
FIG. 8 is a diagram of an example overlay that may be associated with a desktop.

FIG. 7 is a flow chart of an example process 700 for controlling traffic that may be sent to user device 110 based on instructions received via an overlay associated with a desktop. Process 700 may correspond to block 445 of FIG. 4 and/or block 635 of FIG. 6. In an example implementation, process 700 may be performed by administrative server 170. In another example implementation, some or all of process 700 may be performed by a device (e.g., user device 110) or collection of devices separate from, or in combination with administrative server 170. FIG. 8 is a diagram of an example overlay 550 that may be associated with desktop 115. In the description below, all or a portion of process 700 of FIG. 7 will be described with references to overlay 550 of FIG. 8.

In the description below, process 700 is described as being performed by administrative server 170, for explanatory purposes, in a manner that enables an operator, of administrative server 170, to interact with an overlay to control a traffic flow associated with user device 110. In another implementation, process 700 may be performed by user device 110 in a manner that enables a user, of the user device 110, to interact with the overlay to control a traffic flow associated with user device 110.

In the description below, assume that administrative server 170 has established a connection with user device 110, has obtained traffic information associated with desktop 115, and has provided, for display, virtual desktop 175 in a manner similar to that described above with respect to blocks 410-420 of FIG. 4. Assume further that administrative server 170 has obtained a desktop profile associated with user device 110; has established zones, associated with desktop 115, based on the traffic information and the desktop profile; and has provided an overlay, via virtual desktop 175, for display in a manner similar to that described above with respect to blocks 425-440 of FIG. 4.

As shown in FIG. 7, process 700 may include receiving, via an overlay associated with a desktop, selection of a zone (block 705) and presenting, via the desktop, a user interface associated with the selected zone (block 710). For example, an operator, associated with administrative server 170, may desire to control one or more traffic flows, associated with user device 110, that corresponds to one or more zones identified by an overlay (e.g., overlay 550 of FIG. 5B) being displayed via virtual desktop 175. The operator may select a zone, associated with the overlay, to cause administrative server 170 to present, for display via virtual desktop 175, a user interface (e.g., user interface 810 of FIG. 8) associated with the selected zone.

As shown in FIG. 8, overlay 550 may include a collection of zones, user interfaces, and/or buttons, such as zones 555-1, ..., 555-9 of FIG. 5B, a user interface 810, a zone 860, and an update button 865. The quantity of zones, user interfaces, and/or buttons in FIG. 8 is provided for explanatory purposes only. In another implementation, there may be additional zones, user interfaces, and/or buttons; fewer zones, user interfaces, and/or buttons; different zones, user interfaces, and/or buttons, or differently arranged zones, user interfaces, and/or buttons than are shown in FIG. 8.

User interface 810 may allow the operator to identify a manner in which a traffic flow, associated with a selected zone, is to be controlled. User interface 810 may include a collection of fields and/or buttons, such as a stop traffic flow field 815, a cache content field 820, a change traffic rate field 825, a manual update field 830, a modify zone field 835, a set thresholds field 840, a save button 850, and an exit button 855.

Stop traffic flow field 815 may, when selected by the operator, cause administrative server 170 to provide an instruction, to CDS 180, to temporarily stop transmitting, to user device 110, a traffic flow associated with a selected zone. The operator may, in one example, select a field by using a pointing device (e.g., a mouse, a keyboard, etc.), associated with cursor 805, to hover over an area within a zone and/or by pressing a button on the pointing device to select the zone.

Cache content field 820 may, when selected by the operator, cause one or more unique identifiers (e.g., a string of characters and/or symbols, etc.) to be generated with respect to content, being displayed in one or more content states via virtual desktop 175, within the selected zone. For example, a first identifier may be generated that corresponds to first content (e.g., a first image, a first set of text, etc.) associated with a first state. Additionally, or alternatively, a second identifier may be generated that corresponds to second content (e.g., a second image, a second set of text, etc.) associated with a second state. Administrative server 170 may provide the first and/or second identifiers to CDS 180 and may instruct CDS 180 to send, to user device 110, the first code and/or the second code. Additionally, or alternatively, administrative server 170 may provide an instruction to user device 110 to temporarily store the first content associated with the first state and/or the second content associated with the second state. Administrative server 170 may also, or alternatively, instruct user device 110 to display the first content when CDS 180 transmits the first code to user device 110 and/or to display the second content when CDS 180 transmits the second code to user device 110.

Change traffic rate field 825 may allow the operator to enter a traffic rate at which CDS 180 transmits the traffic flow, associated with the selected zone, to user device 110. Administrative server 170 may pre-populate change traffic rate field 825 with a traffic rate at which the traffic flow is being transmitted to user device 110.

Manual update field 830 may, when selected by the operator, cause CDS 180 to transmit a traffic flow, associated with the selected zone. In one example, administrative server 170 may cause an update button 865 to be displayed within an area that corresponds to the selected zone. Update button 865 may, when selected by the operator, cause CDS 180 to transmit the traffic flow to update the content, being displayed via virtual desktop 175, associated with the selected zone.

Modify zone field 835 may, when selected by the operator, allow the selected zone to be modified, such as to resize the selected zone, to merge the selected zone with another zone, to subdivide the selected zone into two or more zones, etc. For example, the operator may select a border, associated with the selected zone and may move the board to adjust an area (e.g., by increasing or decreasing a size) associated with the selected zone. Additionally, or alternatively, the operator may select a border associated with the selected zone and may move the border into an area associated with an adjacent zone. Administrative server 170 may cause the selected zone and the adjacent zone to merge into a single zone. Administrative server 170 may determine a combined traffic rate associated with the single zone and/or may assign a category to the single zone based on the combined traffic rate and/or one or more thresholds associated with a desktop profile.

The operator may cause the selected zone to be subdivided into two zones by reducing a size of the selected zone and selecting an area, associated with overlay 550, that is not associated with a zone as a result of reducing the size of the selected zone. Administrative server 170 may create a zone associated with a size, shape and/or position of the selected area and may determine a traffic rate and/or a category associated with the created zone based on an object that is located within the selected area.

Set thresholds field 840 may, when selected by the operator, allow the operator to set one or more thresholds to be used to determine a category for the selected zone. For example, the operatory may enter a first traffic rate that corresponds to a first threshold or a second traffic rate that corresponds to a second threshold. The operator may specify that the thresholds are to be used for the selected zone (e.g., by selecting an apply to zone field), for all zones within overlay 550 (e.g., by selecting an apply to overlay field), and/or to be included in the desktop profile (e.g., by selecting an apply to profile field).

Save button 850 may, when selected by the operator, cause administrative server 170 to save information associated with the zone in a memory associated with administrative server 170. Exit button 855 may cause administrative server 170 to close user interface 810.

Returning to FIG. 7, process 700 may include receiving, via the user interface, an instruction to modify a zone associated with the overlay (block 715) and updating the overlay based on the instruction (block 720). For example, the operator may select a field (e.g., field 835 of FIG. 8) that allows a zone to be modified. Assume, in this example, that the selected zone corresponds to zone 555-6 of FIG. 8. The operator may select a border (e.g., shown as a dashed green line in FIG. 8) between the selected zone and an adjacent zone (e.g., zone 555-7) and may cause the border to move into an area associated with the adjacent zone. Administrative server 170 may, as a result of moving the border, merge the selected zone and the adjacent zone to create a merged zone (e.g., shown as zone 860 in FIG. 8).

Administrative server 170 may determine a combined traffic rate based on a first traffic rate associated with the selected zone and a second traffic rate associated with the adjacent zone. Administrative server 170 may also, or alternatively, associate a category with the merged zone based on the combined traffic rate and/or one or more thresholds associated with the desktop profile. Administrative server 170 may also, or alternatively, update appearance attributes, associated with the merged zone, based on the associated category and/or the combined traffic rate.

In another example implementation, the operator may select a border associated with a zone and may move the border to modify a size and/or dimensions of the zone in a manner that does not include presenting user interface 810. Additionally, or alternatively, the operator may subdivide zone into two or more zones and/or may merge two or more zones to create a merged zone in a manner that does not include presenting user interface 810.

As further shown in FIG. 7, process 700 may include receiving, via the user interface, a request to control a traffic flow associated with the selected zone (block 725) and providing an instruction to control the traffic flow based on the request (block 730). For example, the operator may select a field, within a user interface (e.g., user interface 810 of FIG. 8) associated with the selected zone, that indicates that a traffic flow, associated with the selected zone, is to be controlled. Assume in this example, that the selected zone corresponds to zone 555-4 (FIG. 8). Administrative server 170 may receive, via the user interface, a request to control the traffic flow and may transmit an instruction to CDS 180 that indicates that the traffic flow, to user device 110, is to be controlled. In one example, the instruction may correspond to a first instruction to temporarily stop transmitting the traffic flow to user device 110 when the operator selects a particular field (e.g., stop traffic flow field 815 of FIG. 8). In another example, the instruction to control the traffic may correspond to a second instruction to change a traffic rate associated with the traffic flow when the operator selects a second field (e.g., change traffic rate field 825 of FIG. 8). In a further example, the instruction to control the traffic may correspond to a third instruction to transmit the traffic flow, based on a manual instruction received from the operator, when the operator selects a third field (e.g., manual update field 830 of FIG. 8). In this example, administrative server 170 may cause update button 865 to be included within the selected zone that, when selected by the operator, causes an instruction to be transmitted to CDS 180 to transmit the traffic flow, to user device 110 to update content associated with the selected zone.

In still a further example, the instruction may correspond to a fourth instruction to transmit one or more identifiers, associated with the traffic flow, when the operator selects a fourth field (e.g., cache content field 820 of FIG. 8). In this example, administrative server 170 may generate one or more identifiers that correspond to content states associated with the selected zone. Administrative server 170 may also, or alternatively, transmit an instruction, to user device 110, to temporarily store content associated with the content states and to display the content when the identifiers are received from CDS 180.

A system and/or method may enable a remote server to access a desktop and to identify zones, associated with portions of area, within the desktop, based on traffic information obtained from a user device. The remote server may identify traffic rates associated with each zone. The remote server may also, or alternatively, create a virtual desktop associated with the desktop and may provide an overlay, via the virtual desktop, that identifies the zones based on the traffic information. An operator, of the remote server, may interact with the overlay to control a traffic flow associated with a zone identified by the overlay as a having a traffic rate that is greater than a threshold.

The system and/or method may enable a user device to provide an overlay, via the desktop, that identifies the zones, associated with the desktop, based on traffic information. The user may interact with the overlay to cause a traffic flow, associated with a zone selected by the user, to be controlled.

Controlling a traffic flow, associated with a zone, may allow an amount of available bandwidth and/or processing capacity, associated with the user device to be managed. Managing the amount of available bandwidth and/or processing capacity may improve the performance of an operation on the user device, over performance of the operation without controlling the rate at which the traffic is transmitted to the user device.

The foregoing description provides illustration and description, but is not intended to be exhaustive or to limit the implementations to the precise form disclosed. Modifications and variations are possible in light of the above disclosure or may be acquired from practice of the embodiments.

While series of blocks have been described with regard to FIGS. 4, 6 and 7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   accessing, by a server device, a desktop associated with a user device;
   obtaining, by the server device and from the user device, traffic information associated with the desktop,
      the traffic information identifying at least one of:
         objects being displayed, by the user device, via the desktop,
         one or more traffic flows associated with the objects, or
         one or more traffic rates associated with the one or more traffic flows;
   creating, by the server device, one or more zones, associated with the desktop, based on the objects and the one or more traffic rates,
      each of the one or more zones corresponding to a respective different portion of the desktop and a respective different set of the objects located within the respective different portion of the desktop;
   obtaining, by the server device, a profile, associated with the user device, that identifies a threshold associated with traffic rates permitted by the user device;
   associating, by the server device and with each of the one or more zones, one or more appearance attributes based on a respective traffic rate of the one or more traffic rates and the threshold;
   presenting, by the server device, an overlay associated with the desktop,
      the overlay identifying the one or more zones and the one or more appearance attributes associated with each of the one or more zones;
   determining, by the server device, that a zone, of the one or more zones identified by the overlay, is associated with a first traffic rate, of the one or more traffic rates, that is greater than the threshold;
   identifying, by the server device, the respective different set of objects, associated with the zone, based on determining that the first traffic rate is greater than the threshold;
   providing, by the server device, an instruction that causes a traffic flow, of the one or more traffic flows, associated with the respective different set of objects, to be transmitted, to the user device, at a second traffic rate that is less than the threshold; and
   modifying, by the server device, the one or more appearance attributes associated with the zone after the traffic flow is transmitted at the second traffic rate.

2. The method of claim 1, where obtaining the traffic information further includes:
   monitoring a plurality of traffic flows being sent or received by the user device;
   identifying the one or more traffic flows, of the plurality of traffic flows, that are associated with the objects; and
   identifying the one or more traffic rates associated with the one or more traffic flows.

3. The method of claim 1, where the objects correspond to at least one of:
   a user interface associated with an application that is open on the desktop,
   an icon associated with an application that is accessible via the desktop,
   a portion of the desktop that corresponds to a background associated with the desktop, or
   a control button associated with an operating system running on the user device.

4. The method of claim 1, where the first traffic rate corresponds to at least one of:
   a data rate associated with the traffic flow,
   a bandwidth utilization rate associated with the traffic flow,
   a frame rate associated with the traffic flow, or
   a rate at which content, associated with the respective different set of objects associated with the zone, is updated based on the traffic flow.

5. The method of claim 1, further comprising:
   associating a first category with a first zone, of the one or more zones, when a third traffic rate, associated with the first zone, is less than a first threshold identified by the profile;
   associating a second category with a second zone, of the one or more zones, when a fourth traffic rate, associated with the second zone, is not less than the first threshold and is less than a second threshold, identified by the profile,
   where the second threshold is greater than the first threshold;
associating a third category with a third zone, of the one or more zones, when a fifth traffic rate, associated with the second zone, is greater than the second threshold; and
providing an instruction that causes a traffic flow, associated with the third zone, to be transmitted at a traffic rate that is less than the second threshold.

6. The method of claim 5, where associating the one or more appearance attributes includes:
associating appearance attributes with the one or more zones based on categories associated with the one or more traffic rates of the one or more zones,
   the appearance attributes identifying colors or patterns associated with the one or more zones, and
   the appearance attributes including at least one of:
      first appearance attributes associated with the first category,
      second appearance attributes associated with the second category, or
      third appearance attributes associated with the third category;
the method further comprising:
generating the overlay based on the one or more zones and the appearance attributes associated with the one or more zones,
   the overlay enabling an operator, associated with the server device, to distinguish between the one or more zones when the overlay is displayed on a display device associated with the server device.

7. The method of claim 6, further comprising:
presenting, for display on the display device, a virtual desktop, associated with the desktop,
   the virtual desktop including the objects associated with the desktop, and
   the virtual desktop enabling the operator to interact with the objects to access an application installed on the user device as though the operator was a user of the user device;
presenting, for display and via the virtual desktop, the overlay associated with the desktop;
receiving, from the operator and via the virtual desktop, selection of a particular zone, within the overlay and associated with third appearance attributes; and
providing another instruction that causes a particular traffic flow of the one or more traffic flows, associated with the particular zone, to be transmitted, to the user device, at a traffic rate that is less than the second threshold.

8. The method of claim 6, further comprising:
presenting, for display on the display device, a virtual desktop, associated with the desktop,
   the virtual desktop including the objects associated with the desktop, and
   the virtual desktop enabling the operator to interact with the objects to access an application installed on the user device as though the operator was a user of the user device;
presenting for display, via the virtual desktop, the overlay associated with the desktop;
receiving, from an operator of the server device and via the virtual desktop, selection of a particular zone associated with the overlay;
presenting, via the virtual desktop, a user interface associated with the particular zone;
receiving, via the user interface, a request to control a particular traffic flow, of the one or more traffic flows, associated with the particular zone; and
providing another instruction that causes the particular traffic flow to be transmitted, to the user device, at a traffic rate that is less than the second threshold.

9. A user device comprising:
one or more processors to:
obtain traffic information associated with a desktop displayed by the user device,
   the traffic information identifying:
      a first set of objects being displayed via a first portion of the desktop and a second set of objects being displayed via a second portion the desktop, and
      a first traffic rate corresponding to a first traffic flow that is associated with the first set of objects and a second traffic rate corresponding to a second traffic flow that is associated with the second set of objects,
create a first zone, associated with the first traffic rate, that corresponds to the first portion and a second zone, associated with the second traffic rate, that corresponds to the second portion,
compare the first traffic rate and the second traffic rate to a threshold,
associate the first zone with a first category based on a determination that the first traffic rate is greater than the threshold,
associate the second zone with a second category based on a determination that the second traffic rate is not greater than the threshold,
provide, for display via the desktop, an overlay that identifies the first zone and the second zone,
   the first zone being associated, within the overlay, with first appearance attributes associated with the first category, and
   the second zone being associated, within the overlay, with second appearance attributes associated with the second category,
receive, via the overlay provided for display via the desktop, selection of the first zone based on the first appearance attributes, and
output, to a server device, an instruction to control the first traffic flow, associated with the first zone, based on receiving the selection of the first zone.

10. The user device of claim 9, where the one or more processors are further to:
receive, from the server device, the first traffic flow at a traffic rate that is not greater than the threshold as a result of outputting the instruction to control the first traffic flow, and
associate the second appearance attributes with the first zone, within the overlay, as a result of receiving the first traffic flow at the traffic rate that is not greater than the threshold.

11. The user device of claim 9, where the one or more processors are further to:
retrieve a profile associated with the user device, and
obtain the threshold from the profile,
   the threshold being predetermined by the user device or specified by a user of the user device.

12. The user device of claim 9, where, when receiving the selection of the first zone, the one or more processors are further to:

provide, for display via the desktop, a user interface associated with the first zone based on receiving the selection of the first zone,
  the user interface including a plurality of fields to control the first traffic flow,
  the plurality of fields including at least two of a field to stop transmitting the first traffic flow to the user device, a field to identify a traffic rate at which the first traffic flow is to be transmitted, or a field to modify the first zone,
receive, via one of the plurality of fields of the user interface and from a user of the user device, a request to control the first traffic flow in a particular manner, and
output, to the server device, information that identifies the particular manner in which to control the first traffic flow.

13. The user device of claim 9, where, when receiving the selection of the first zone, the one or more processors are further to:
provide, for display via the desktop, a user interface associated with the first zone based on receiving the selection of the first zone,
receive, via the user interface and from a user of the user device, a request to reduce the first traffic rate to a level that is not greater than the threshold, and
output, to the server device, an instruction to control the first traffic flow in a manner that reduces the first traffic rate to the level that is not greater than the threshold.

14. The user device of claim 9, where, when receiving the selection of the first zone, the one or more processors are further to:
provide, for display via the desktop, a user interface associated with the first zone based on receiving the selection of the first zone,
receive, via the user interface and from a user of the user device, a request to stop transmitting the first traffic flow to the user device, and
output, to the server device, an instruction to control the first traffic flow in a manner that causes the first traffic flow to stop being transmitted to the user device.

15. The user device of claim 9, where, when receiving the selection of the first zone, the one or more processors are further to:
provide, for display via the desktop, a user interface associated with the first zone based on receiving the selection of the first zone,
receive, via the user interface and from a user of the user device, a request to stop transmitting the first traffic flow when requested by a user of the user device,
output, to the server device, an instruction to control the first traffic flow in a manner that causes the first traffic flow to stop being transmitted to the user device,
provide, for display via the desktop, a button, associated with the selected zone, that causes the first traffic flow to be transmitted, to the user device, when the button is selected by the user,
receive, via the desktop, an indication that the user has selected the button,
output, to the server device, another instruction to transmit the first traffic flow to the user device in response to receiving the indication, and
receive, from the server device, the first traffic flow.

16. The user device of claim 9, where the one or more processors are further to:
receive, via the desktop, a request to combine the first zone and the second zone to create a third zone,
determine a third traffic rate, associated with the third zone, based on a combination of the first traffic rate and the second traffic rate,
determine that the third traffic rate is greater than the threshold, and
output, to the sever device, another instruction to control the first traffic flow or the second traffic flow in a manner that causes the third flow to be reduced to a level that is less than the threshold.

17. The user device of claim 16, where the one or more processors are further to:
create the third zone in a manner that includes a portion, of the desktop, that corresponds to the first portion and the second portion.

18. The user device of claim 9, where the one or more processors are further to:
receive, from the server device, a request for the traffic information, and
output, to the server device, the traffic information to allow the server device to control the desktop based on the traffic information.

19. A server device comprising:
one or more processors to:
  obtain, from the user device, traffic information that identifies:
    a first traffic rate for first traffic associated with a first object within a desktop associated with the user device, and
    a second traffic rate for second traffic associated with a second object within the desktop,
  provide, for display on a display device associated with the server device, a virtual desktop based on the traffic information,
    the virtual desktop enabling an operator, of the server device, to access the desktop, associated with the user device, as though the operator was a user of the user device,
  create a first zone, that corresponds to a first portion of the desktop, in which the first object is located,
  create a second zone, that corresponds to a second portion of the desktop, in which the second object is located,
  compare the first traffic rate and the second traffic rate to a threshold,
  provide, for display via the virtual desktop, an overlay that identifies the first zone and the second zone,
    the first zone having first appearance attributes based on a determination that the first traffic rate is greater than the threshold, and
    the second zone having second appearance attributes based on a determination that the second traffic rate is not greater than the threshold,
      the overlay including the first appearance attributes of the first zone and the second appearance attributes of the second zone,
  receive, from the operator and via the overlay provided for display via the virtual desktop, selection of the first zone, and
  output a request to control a manner in which the first traffic is transmitted to the user device based on the selection of the first zone.

20. The server device of claim 19, where an object corresponds to an area, within the desktop, in which at least one of:
a user interface, associated with an application, is being displayed,
video content is playing,
an image is being displayed, advertising content is being displayed,
textual content is being displayed, or
a control button, associated with an application or an operating system executing on the user device, is being displayed.

21. The server device of claim 19, where the one or more processors are further to:
receive, via the virtual desktop, a request to subdivide the first zone into a third zone and a fourth zone,
the third zone being associated with a third object, and
the fourth zone being associated with a fourth object,
compare a third traffic rate, associated with the third object and a fourth traffic rate, associated with the fourth object, to the threshold,
provide, for display via the overlay, the third zone and the fourth zone,
the third zone being associated with the first appearance attributes based on a determination that the third traffic rate is greater than the threshold, and
the fourth zone being associated with the second appearance attributes based on a determination that the fourth traffic rate is not greater than the threshold,
receive, via the overlay, selection of the third zone, and
output a request to control a manner in which third traffic, associated with the third object, is transmitted to the user device based on the selection of the third zone.

22. The server device of claim 21, where the first object is based on the third object and the fourth object, and
where the first traffic rate is based on a combination of the third traffic rate and the fourth traffic rate.

23. The server device of claim 19, where the one or more processors are further to:
receive, via the overlay, selection of the second zone,
present, for display via the virtual desktop, a user interface associated with the second zone,
receive, from the operator and via the user interface, an indication that the user device is to temporarily store first content associated with the second object and second content associated with the second object,
generate a first identifier associated with the first content and a second identifier associated with the second content,
output a first instruction to cause the first identifier and the second identifier to be provided, to the user device, instead of traffic associated with the first content or traffic associated with the second content, and
output, to the user device, a second instruction to display, via the virtual desktop, the first content when the first identifier is received and the second content when the second identifier is received.

24. The server device of claim 19, where the one or more processors are further to:
determine that first content and second content are displayed in an alternating manner based on a time interval and via the virtual desktop at a location within the second zone,
generate a first identifier associated with the first content and a second identifier associated with the second content,
output, to another server device, a first instruction to cause the first identifier and the second identifier to be provided, in the alternating manner and to the user device, instead of traffic associated with the first content or traffic associated with the second content, and
output, to the user device, a second instruction to display, via the virtual desktop, the first content when the first identifier is received and the second content when the second identifier is received.

25. The server device of claim 19, where, when receiving the selection of the first zone, the one or more processors are further to:
provide, for display via the virtual desktop, a user interface associated with the first zone,
receive, from the operator and via the user interface, an indication that the first traffic rate, associated with the first traffic, is to be reduced to a level that is less than the threshold, and
output the request to control the manner in which the first traffic is transmitted to the user device by reducing the first traffic rate to the level that is less than the threshold.

* * * * *